United States Patent [19]

Somes

[11] Patent Number: 5,429,015
[45] Date of Patent: Jul. 4, 1995

[54] TWO DEGREE OF FREEDOM ROBOTIC MANIPULATOR CONSTRUCTED FROM ROTARY DRIVES

[76] Inventor: Steven D. Somes, 8840 Eagle Rd., Kirtland, Ohio 44094

[21] Appl. No.: 63,952

[22] Filed: May 20, 1993

[51] Int. Cl.⁶ .......................... F16H 37/06; F16H 7/02
[52] U.S. Cl. .................. 74/665 B; 74/665 GE; 474/85; 474/88
[58] Field of Search .......... 74/665 B, 665 GE, 665 L; 474/84, 85, 88, 70

[56] References Cited

U.S. PATENT DOCUMENTS

| | | | |
|---|---|---|---|
| 3,534,634 | 10/1970 | Kawanami | 474/84 |
| 4,188,837 | 2/1980 | Bendall | 74/665 GE X |
| 4,557,662 | 12/1985 | Teraughi et al. | 414/744 R |
| 4,896,809 | 1/1990 | Koyanagi | 474/84 X |
| 5,105,672 | 4/1992 | Carson et al. | 74/89.22 |

FOREIGN PATENT DOCUMENTS

| | | | |
|---|---|---|---|
| 0364269 | 4/1990 | European Pat. Off. | 474/70 |
| 0297327 | 11/1989 | Japan | 474/70 |
| 903602 | 8/1962 | United Kingdom | 74/665 GE |
| 1677422 | 9/1991 | U.S.S.R. | 474/85 |

OTHER PUBLICATIONS

Conceptual Drawing For Roto-Lok ® Driven Scara Robot, 7 Jun. 1991.

*Primary Examiner*—Edward K. Look
*Assistant Examiner*—Hoang Nguyen

[57] ABSTRACT

A two degree-of-freedom robot manipulator is constructed from two rotary drives of prior invention. Each rotary drive consists of a relatively small diameter cylindrical driving member and a relatively larvae diameter cylindrical driven member coupled by a cable system. The driving member of rotary drive 2 is positioned with its axis of rotation coincident with the axis of rotation of the driven member of rotary drive 1. The driven member of drive 2 is rotatably mounted to the driven member of drive 1 to realize the required relative positioning of the driving and driven members of drive 2. The driving members of both rotary drives are mounted in a fixed reference frame. Coordinated control of the driving members allows two axis dynamic control of a tool apparatus mounted to the second driven member. This construction method extends the precision of the rotary drive to two degrees of freedom and obviates the apparatus required in other methods to transmit torques from the fixed reference frame to the second driven member.

15 Claims, 1 Drawing Sheet

5,429,015

TWO DEGREE OF FREEDOM ROBOTIC MANIPULATOR CONSTRUCTED FROM ROTARY DRIVES

BACKGROUND OF THE INVENTION

1. Field of the Invention This invention relates to a two degree-of-freedom positioning and manipulating apparatus, and, more particularly, to a two degree-of-freedom manipulating apparatus constructed from two rotary drives.

2. Description of the Prior Art

First the term "degree of freedom" will be clarified with respect to a mechanical manipulating apparatus. Any object's attitude in three-dimensional space can be minimally described with 6 coordinate parameters: 3 of displacement and 3 of rotation. A manipulator with 2 degrees of freedom, then, can move an object in 2 of the 6 available coordinate space parameters.

In multiple degree-of-freedom manipulators and positioners, such as industrial robots, it is often desirous to locate the mechanical power sources, such as rotary electric or hydraulic motors, on a fixed frame coupled to, but not translated with, the manipulator. With the relatively heavy motors not translated with the manipulator, the manipulator apparatus can be made lighter and more agile than would otherwise be possible. Typically, with more than 1 degree of freedom, a transmission apparatus is required to deliver mechanical power from the fixed source to the distally mounted manipulator members, such as the timing belt apparatus driving the second link on the SCARA (Selective Compliance Assembly Robot Arm) robot disclosed in U.S. Pat. No. 4,557,662.

It is also common in multiple degree-of-freedom manipulators to employ reduction drives to increase the usable level of motor power, to amplify the torque output of rotary motors, and to increase the manipulator's positioning precision.

U.S. Pat. No. 5,105,672 (Carson et. al.) discloses a precision rotary drive with particularly desirable performance characteristics consisting of a relatively large diameter cylindrical driven member coupled to a relatively small diameter cylindrical driver member through a cable system.

SUMMARY OF THE INVENTION

The invention described and claimed herein comprises a two degree-of-freedom positioning and manipulating apparatus employing rotary drives. The driven member of the second rotary drive is mounted to the periphery of the driven member of the first rotary drive while maintaining individual drive functionality.

Among the objects of the invention are the following:

To provide new and useful two degree-of-freedom positioning apparatus;

To provide new and useful two degree-of-freedom force and torque transmitting apparatus; and To provide new and useful two degree-of-freedom manipulatory apparatus with integral rotary drive reduction mechanisms.

DESCRIPTION OF THE PREFERRED EMBODIMENT

Figure 1:
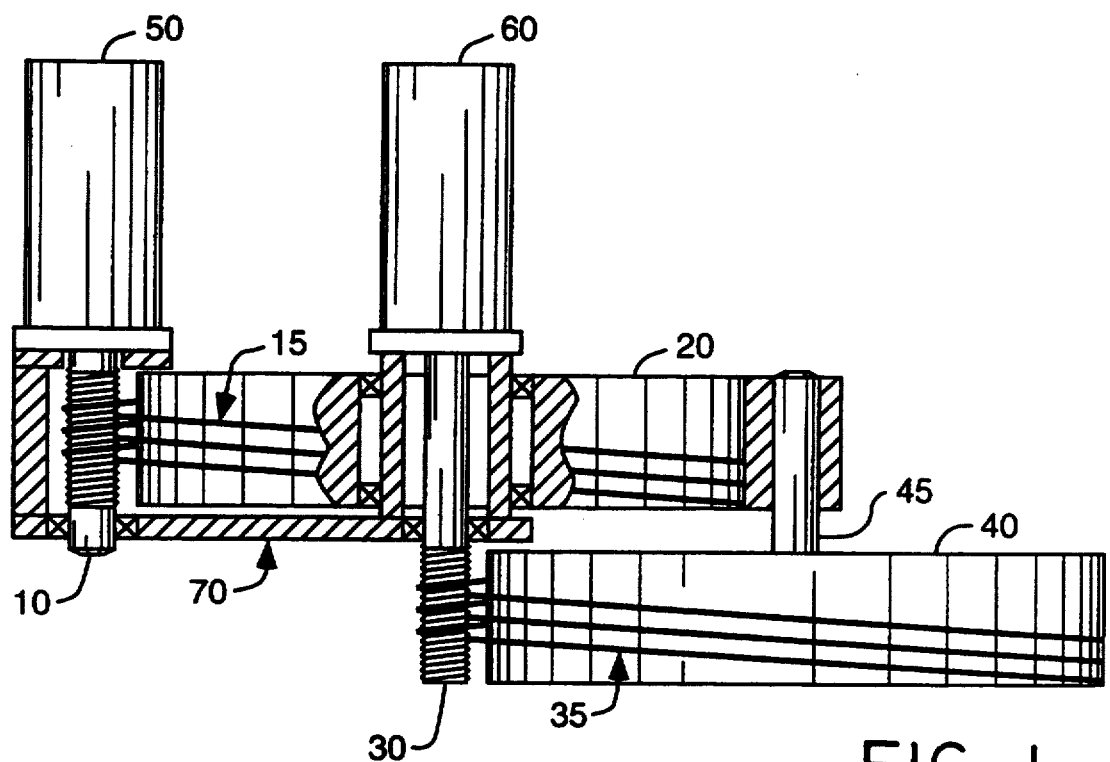
FIG. 1 shows a side view of the present invention. Cross sections and cutaways are employed to show the mounting of some of the journaled members.

FIG. 1 shows a side view of the present invention. Driver member screw 10 receives rotary input from motor 50 and is mounted and journaled for rotation to fixed support member 70. Driven member drum 20 is rotatably mounted to support member 70. Screw member 10 and drum member 20 are rotationally coupled through cable system 15. These members summarize a single rotary drive configuration as disclosed in U.S. Pat. No. 5,105,672.

A second rotary drive consists of a driven drum element 40 rotatably mounted to drum element 20, with axis of rotation parallel to that of drum element 20. For this embodiment, mounting is achieved by fixing axle element 45 to the periphery of drum 20. Depending on the circumstances, drum 40 may also be mounted with its axis of rotation either lying within the circumference of drum 20 or spaced beyond the drum circumference by means of an extension member.

Driver screw member 30 is rotatably mounted to fixed member 70 with its axis of rotation coaxial to that of drum 20. Screw 30 is shown passing through the center of drum 20. This screw location is not mandatory for the design and its benefits; the essential requirement is that screw 30 and drum 20 rotate along the same axis and that each can rotate freely and separately from the other.

Screw 30 and drum 40 are rotatably coupled through cable system 35. Motor 60 is mounted to support member 70 and provides rotary input for screw 30.

The radial mounting distance of axle 45 from the center of drum 20, the diameter of screw 30, and the diameter of drum 40 must be selected together to meet the particular application's drive and workspace requirements while maintaining the required spacing between screw 30 and drum 40 for proper operation of the cable coupling system.

Figure 2:
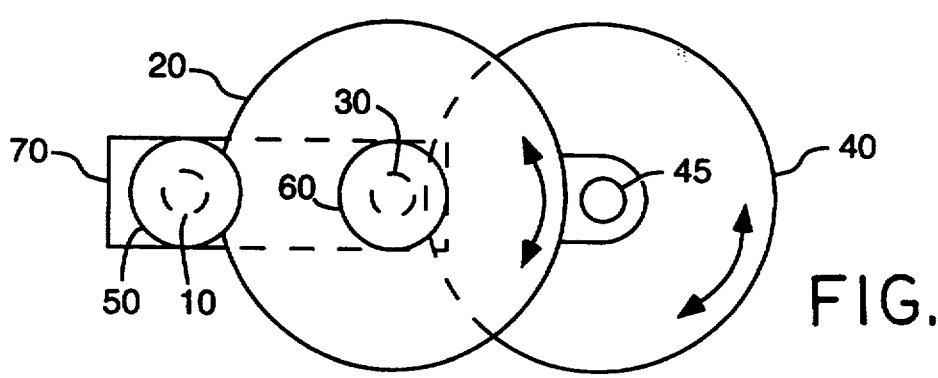
FIG. 2 is a reduced top view of the invention, with arrows showing directions of rotation of the primary manipulator members.
Figure 3:
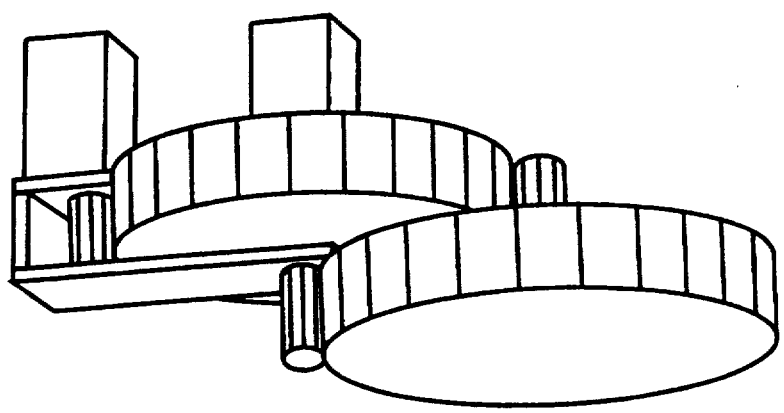
FIG. 3 is a reduced side perspective view of the invention.

In the preferred method of operation, best shown in FIG. 2, motor 50 turns screw 10, which causes drum 20 to rotate. Drum 40 will revolve about screw 30 in a circular path at a rate and direction dictated by the rotation of drum 20. Required relative spacing between screw 30 and drum 40 will be maintained during revolution. Motor 60 turns screw 30, causing drum 40 to rotate. The revolving of drum 40 about screw 30 and its rotation via rotary input from screw 30 may occur simultaneously. Note that if screw 30 were held stationary while drum 20 was rotated, drum 40 would also rotate relative to the fixed reference frame as it revolved about the screw. This rotational coupling is predictable and does not detract from the usefulness of the invention.

In a typical application of this two degree-of-freedom configuration, a tool or a mechanical apparatus with additional degrees of freedom would be attached to the periphery of drum 40. Multiple sensors would provide manipulator dynamic status information to a computer controller. The sensors could include any or all of the following: rotary position sensors on the motors or drums; force and torque sensors on the motors or drums; and force, torque, or acceleration sensors on the tool or apparatus fixed to the drum. Using the sensor information, a controller would regulate and coordinate electrical power to the motors to achieve desired position or acceleration of the tool or apparatus in two axes, as is known in the art.

Further, with the manipulator oriented with vertical drum and screw axis of rotation, and a grasping device and vertical travel apparatus fixed to the periphery of drum 40, this manipulator could be effectively employed in the popular SCARA robot configuration for execution of pick-and-place assembly and a variety of material handling tasks. With end effectors particular to the application, it could also be used in automated grinding and edge finishing operations.

The desirable characteristics of the rotary drive and the ability to mount the driving motors in a fixed reference frame without requiring additional transmission means to transmit power to the distally mounted second rotation axis would give this SCARA configuration both performance and economy advantages over current technology.

Just as additional degree-of-freedom apparatus may be fixed to the output drum of the manipulator, the manipulator itself may be fixed to another manipulatory apparatus. In this case, fixed member 70 would be driven or moved by some other mechanism. The two degree-of-freedom manipulator described here would continue to function normally, with its control integrated or linked with that of the larger system as is known in the art.

A variation on the preferred embodiment involves using the two degree-of-freedom apparatus as a measuring rather than manipulating device. Sensors are fixed to the screw elements in place of the motors. If rotary position sensors are used, the location or orientation of a point on the output drum could be deduced from the rotary position of the screws. An object's dimensional information could be gathered by fixing a touch probe device to drum 40 and manually moving it to particular measurement points on an object. Such a mechanism is commonly referred to as a Coordinate Measuring Machine (CMM).

The above discussed embodiments serve only to illustrate the principles of the invention. The preferred embodiment employs the rotary drive as disclosed in U.S. Pat. No. 5,105,672. The invention claimed and described herein could obviously be constructed with any other rotary drive which consists of a generally cylindrical single driver and a generally cylindrical single driven member. This includes, for instance, an arrangement of common gears. Other modifications in structure, arrangement, proportions, and components are obvious to those skilled in the art for the application of this invention to particular tasks or environments. The appended claims are intended to cover all such modifications within the limits of the true spirit and scope of the invention.

What I claim is:

1. A two degree-of-freedom positioning and manipulating apparatus, comprising:
   a first driven member rotatable about a first driven axis;
   first driving means coupled to said first driven member for rotating said first driven member about said first driven axis;
   a second driven member rotatably mounted in close proximity to said first driven member for rotating about a second driven axis;
   second driving means coupled at a drive point to said second driven member for rotating said second driven member about said second driven axis; and
   wherein said drive point is generally coincident with said first driven axis.

2. The apparatus of claim 1, said driven member and said second driven member each comprising a generally cylindrical body.

3. The apparatus of claim 1, wherein said first driving means and said second driving means are both fixedly secured to a frame member.

4. A two degree-of-freedom positioning and manipulating apparatus, comprising:
   a first cylindrical driven member rotatably mounted to a fixed support member for rotation about a first driven axis;
   first drive means mounted to said fixed support member and adjacently disposed to said first cylindrical driven member for controllably rotating said first cylindrical driven member about said first driven axis;
   a second cylindrical driven member rotatably mounted in close proximity to said first cylindrical driven member for rotation about a second driven axis; and
   a second drive means mounted to said fixed support member and adjacently disposed to said second cylindrical driven member for controllably rotating said second cylindrical driven member about said second driven axis.

5. The apparatus of claim 4, said second drive means comprising a driver member which rotates about a driver axis and which is coupled to said second cylindrical driven member in order to controllably rotate said second cylindrical driver member, and wherein said driver axis is generally coincident with said first driven axis.

6. A two degree-of-freedom positioning and manipulating apparatus, comprising:
   a first rotary drive comprising a generally cylindrical first driven member and a generally cylindrical first driver member, said first driver member being rotatable about a first driver axis and coupled to said first driven member whereby rotation of said first driver member rotates said first driven member about a first driven axis, said first driver axis and said first driven axis being generally parallel;
   a second rotary drive comprising a generally cylindrical second driven member and a generally cylindrical second driver member, said second driver member being rotatable about a second driver axis and coupled to said second driven member whereby rotation of said second driver member rotates said second driven member about a second driven axis, said second driver axis and said second driven axis being generally parallel; and
   wherein the second driven member is rotatably mounted in close proximity to the first driven member for rotation about said second driven axis, said first driven axis and said second driven axis being offset and generally parallel, and said second driver axis being generally coincident with said first driven axis.

7. The apparatus of claim 6 in which the first and second driver members each receive a respective rotary input from a respective mechanical rotary power source.

8. The apparatus of claim 7 further including a fixed reference frame, and wherein a non-rotating component of each mechanical rotary power source is mounted stationary to said fixed reference frame relative to the rotation of the first driven member.

9. The apparatus of claim 1 further including a fixed reference frame, and wherein a rotating component of each mechanical rotary power source is rotatably mounted to said fixed reference frame relative to the rotation of the first driven member.

10. A two degree-of-freedom positioning and manipulating apparatus, comprising:
   a first rotary drive comprising a generally cylindrical first driven member and a generally cylindrical first driver member, said first driver member being rotatable about a first driver axis and coupled to said first driven member whereby rotation of said first driver member rotates said first driven member about a first driven axis, said first driver axis and said first driven axis being generally parallel;
   a second rotary drive comprising a generally cylindrical second driven member and a generally cylindrical second driver member, said second driver member being rotatable about a second driver axis and coupled to said second driven member whereby rotation of said second driver member rotates said second driven member about a second driven axis, said second driver axis and said second driven axis being generally parallel; and
   wherein the second driven member is rotatably mounted in close proximity to the first driven member for rotation about said second driven axis, said first driven axis and said second driven axis being offset and generally parallel, and said second driver axis being generally coincident with said first driven axis; and
   wherein said first driver member is coupled to said first driven member by a first cable means and said second driven member is coupled to said second driven member by a second cable means.

11. The apparatus of claim 10 in which the first and second driver members each receive a respective rotary input from a respective mechanical rotary power source.

12. The apparatus of claim 11 further including a fixed reference frame, and wherein a non-rotating component of each mechanical rotary power source is mounted stationary to said fixed reference frame relative to the rotation of the first driven member.

13. The apparatus of claim 1 further including a fixed reference frame, and wherein a rotating component of each mechanical rotary power source is rotatably mounted to said fixed reference frame relative to the rotation of the first driven member.

14. A two degree-of-freedom measuring apparatus, comprising:
   a first rotary drive comprising a generally cylindrical first driven member and a generally cylindrical first driver member, said first driver member being rotatable about a first driver axis and coupled to said first driven member whereby rotation of said first driver member rotates said first driven member about a first driven axis, said first driver axis and said first driven axis being generally parallel;
   a second rotary drive comprising a generally cylindrical second driven member and a generally cylindrical second driver member, said second driver member being rotatable about a second driver axis and coupled to said second driven member whereby rotation of said second driver member rotates said second driven member about a second driven axis, said second driver axis and said second driven axis being generally parallel;
   wherein the second driver member is rotatably mounted in close proximity to the first driver member for rotation about said second driver axis, said first driver axis and said second driver axis being offset and generally parallel, and said second driven axis being generally coincident with said first driver axis;
   a first measuring means coupled to said first driven member; and
   a second measuring means coupled to said second driven member.

15. The apparatus of claim 14, wherein said first driven member and said second driven member are both fixedly secured to a frame member.

* * * * *